United States Patent [19]

Takanishi

[11] Patent Number: 5,577,797
[45] Date of Patent: Nov. 26, 1996

[54] FLOOR SIDE STRUCTURE OF AUTOMOBILE WITH CLOSED CROSS-SECTIONAL PORTION

[75] Inventor: Toshiaki Takanishi, Hamamatsu, Japan

[73] Assignee: Suzuki Motor Corporation, Japan

[21] Appl. No.: 349,958

[22] Filed: Dec. 6, 1994

[30] Foreign Application Priority Data

Dec. 14, 1993 [JP] Japan .................. 5-312905

[51] Int. Cl.$^6$ ............................. B62D 23/00
[52] U.S. Cl. ................ 296/203; 296/30; 296/204; 296/209
[58] Field of Search ................ 296/209, 204, 296/188, 203, 29, 30

[56] References Cited

U.S. PATENT DOCUMENTS 5,354,115  10/1994  Esaki ...................... 296/209 X

FOREIGN PATENT DOCUMENTS 406064561  3/1994  Japan ...................... 296/30

*Primary Examiner*—David M. Mitchell
*Assistant Examiner*—Kia M. Robinson
*Attorney, Agent, or Firm*—Patterson & Streets, L.L.P.

[57] ABSTRACT

A side structure of a floor of an automobile can improve the balance of the stiffness and prevent generation of noise in a room of the automobile. A rear floor side member 26 is disposed along an inner panel 24 of a side sill 21 and a rear floor cross member 27 is disposed along a depending wall 23a of a rear floor panel 23. Both end portions of the rear floor cross member go over the rear floor side member 26 and are fixed to the side sill inner panel 24.

3 Claims, 5 Drawing Sheets

FLOOR SIDE STRUCTURE OF AUTOMOBILE WITH CLOSED CROSS-SECTIONAL PORTION

FIELD OF THE INVENTION AND RELATED ART STATEMENT

The present invention relates to a side structure of a floor of an automobile.

In a portion in which a rear seat of an automobile is mounted, a rear floor is formed so that the rear floor is raised by one step from a main floor. Both sides of a rear floor panel forming the rear floor are welded to side sills extending in the forward and backward direction of a body of the automobile. Since this portion maintains the strength of a rear portion a room of the automobile and a rear wheel suspension device is also disposed in close vicinity thereto, it is important to ensure the stiffness for twist.

A conventional side structure of a floor of an automobile is now described.

FIGS. 7 to 9 show a first prior art example of a side structure of a floor of an automobile. FIG. 7 is a sectional view taken along line A—A of FIG. 1, FIG. 8 is a sectional view taken along line J—J of FIG. 7, and FIG. 9 is a sectional view taken along line K—K of FIG. 7.

Numeral 1 denotes a rear floor panel. Each side portion of the rear floor panel 1 is welded to an inner panel 3 of a side sill 2 extending in the forward and backward direction of an automobile body. Numeral 4 denotes an outer panel of the side sill 2.

Numeral 5 denotes a rear floor side member having a substantially L-shaped section and extending in the right and left direction of the body. An upper end flange of the member 5 is welded to the rear floor panel 1 and a lower end flange of the member 5 is welded to a lower end flange of the side sill inner panel 3.

Numeral 6 denotes a rear floor cross member having a substantially L-shaped section and extending in the right and left direction of the body. An upper end flange of a rear floor cross member 6 is welded to the rear floor panel 1 and a lower end flange of the member 6 is welded to a rear end flange of a main floor panel 7.

FIGS. 10 to 12 show a second prior art example of a side structure of a floor of an automobile. FIG. 10 is a sectional view taken along line A—A of FIG. 1, FIG. 11 is a sectional view taken along line L—L of FIG. 10 and FIG. 12 is a sectional view taken along line M—M. Elements having the same function as that of the first prior art example are designated by the same numerals and description thereof is omitted. In this prior art example, each side portion of a rear floor cross member 8 is directly welded to an inner panel 3 of the side sill 2. A rear floor side member 9 has a substantially U-shaped section and extends in the forward and backward direction of the body. A pair of upper flanges of the member 9 is welded to the rear floor panel 1 and a front end flange 11 of the member 9 is welded to the rear floor cross member 8. Numeral 10 denotes a torque box having both ends welded to the side sill inner panel 3 and the rear floor side member 9.

In the above prior art examples, since the both side portions of the rear floor cross members 6 and 8 are welded to vertical walls of the member to be welded, the welded planes are coincident with the peeling-off direction in respect to the stress in the right and left direction of the body and are disadvantageous in strength.

Further, since the rear edge of the main floor panel 7, the rear floor panel 1 and the rear floor cross member 6 or 8 are welded to a portion indicated by reference N of FIGS. 9 and 12 collectively, the stiffness is discontinuous in the N portion and the stress is concentrated in the N portion, so that the stiffness in the N portion is not balanced with that in other portions.

In addition, the unbalance of the stiffness adversely affects the vibration to thereby cause generation of noise in a room of the automobile.

OBJECT AND SUMMARY OF THE INVENTION

The present invention has been made in view of the above problems and an object of the present invention is to provide a side structure of a floor of an automobile capable of improving the balance of the stiffness and preventing generation of noise in a room of the automobile.

In order to achieve the above object, in a side structure of a floor of an automobile in which a depending wall provided in a front end of a rear floor panel is connected to a rear end of a main floor panel to form a floor panel and a side sill is fixedly mounted to each side of said floor panel, a rear floor side member is disposed along an inner panel of the side sill and a rear floor cross member is disposed along the depending wall of the rear floor panel. Both end portions of the rear floor cross member go over said rear floor side member and are fixed to the inner panel of the side sill.

DETAILED DESCRIPTION OF PREFERRED EMBODIMENTS

Referring now to FIGS. 1 to 6, an embodiment of the present invention is described. The left side of an automobile as viewed from an automobile body while looking ahead is shown in the figures, while the right side of the automobile is substantially symmetrical.

Figure 1:
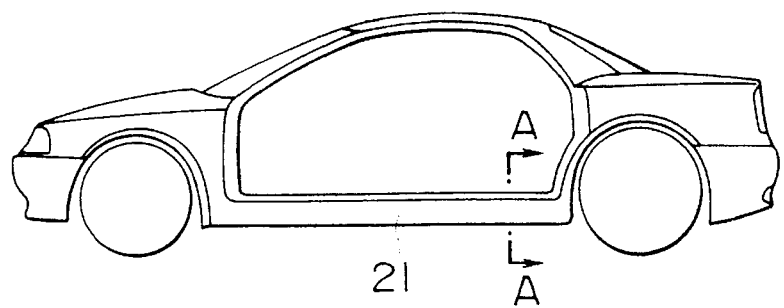
FIG. 1 is a side view of the left side of an automobile to which a side structure of a floor of an automobile according to the present invention is applied.

FIG. 1 is a side view of an automobile suitable for application of the present invention with doors and components mounted in a room of the automobile removed. Numeral 21 denotes a side sill disposed in both sides of a floor 20 of an automobile body.

Figure 2:
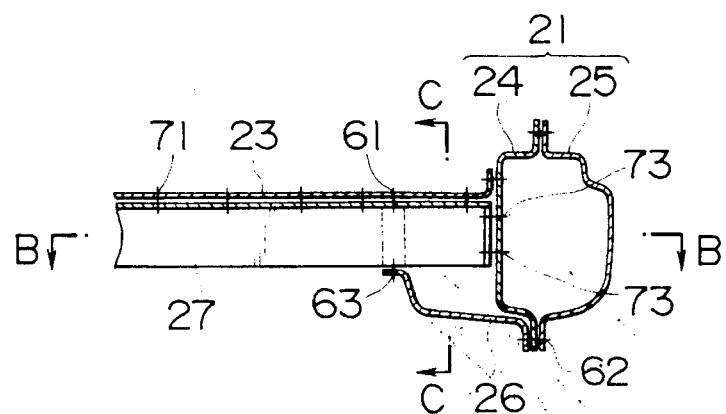
FIG. 2 is an enlarged sectional view taken along line A—A of FIG. 1.
Figure 3:
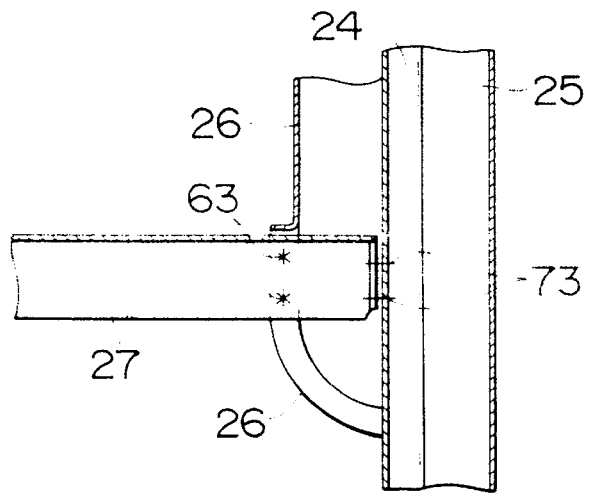
FIG. 3 is a sectional view taken along line B—B of FIG. 2.

FIG. 2 is a sectional view taken along line A—A of FIG. 1. FIG. 3 is a sectional view taken along line B—B of FIG. 2 and FIG. 4 is a sectional view taken along line C—C of FIG. 2.

Figure 4:
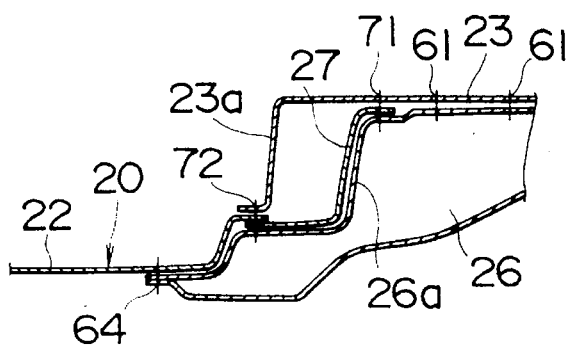
FIG. 4 is a sectional view taken along line C—C of FIG. 2.

In FIG. 4, numeral 22 denotes a main floor panel of the body. A rear end of the main floor panel 22 is connected to a depending wall 23a provided in a front end of a rear floor panel 23 to form a floor 20 of the body.

As shown in FIG. 2, each side of the floor panel 20 is welded to a side sill inner panel (rear floor front compartment) 24 of the side sill 21 (as indicated by numeral 73 of FIGS. 2 and 3). Numeral 25 denotes an outer panel of the side sill 21. A relation of the side sill inner panel 24 and the rear floor front compartment will be described later with reference to FIG. 6.

Numeral 26 denotes a rear floor side member having a substantially L-shaped section and extending in the forward and backward direction of the body. An upper end flange of the member 26 is welded to the rear floor panel 23 (as indicated by numeral 61 of FIGS. 2 and 4) and a lower end flange of the member 26 is welded to a lower end flange of the side sill inner panel 24 (as indicated by numeral 62 of FIG. 5).

Numeral 27 denotes a rear floor cross member having a substantially L-shaped section and extending in the right and left direction of the body. An upper end flange of the member 27 is welded to the rear floor panel 23 (as indicated by numeral 71 of FIG. 2) and a lower end flange of the member is welded to a rear end flange of the main floor panel 22 (as indicated by numeral 72 of FIG. 4).

Figure 5:
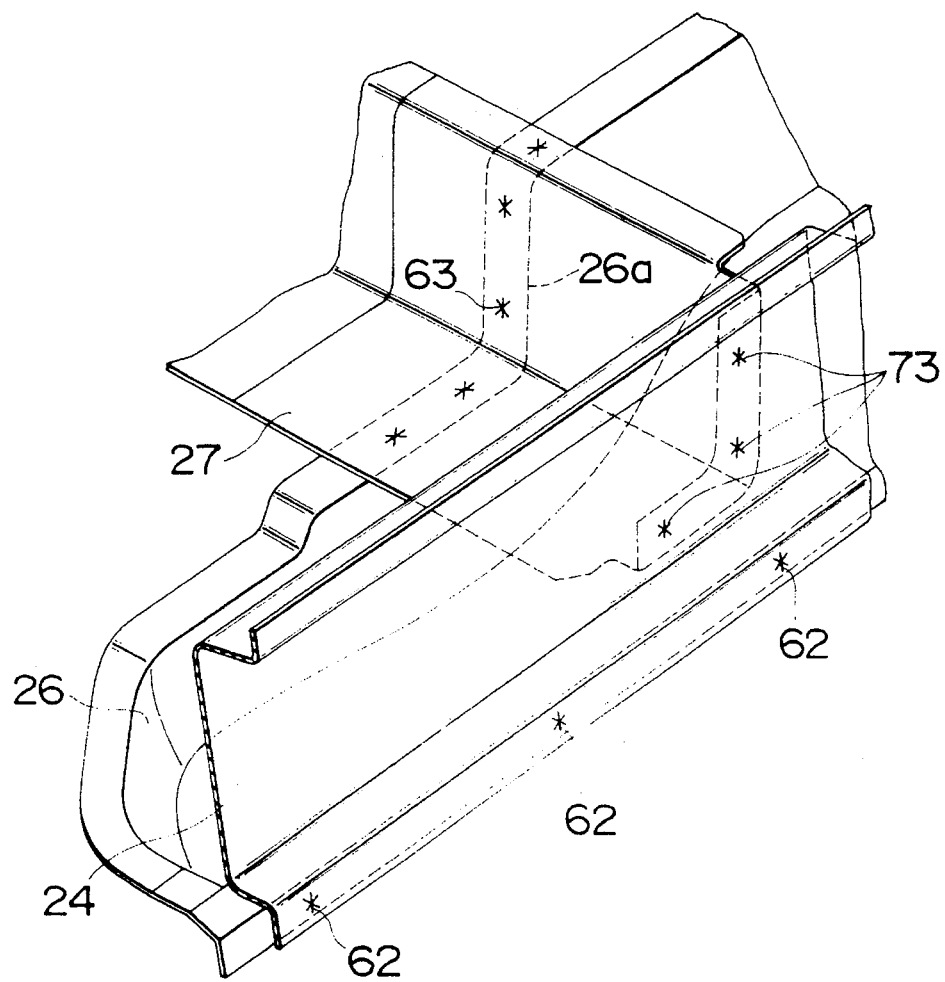
FIG. 5 is an enlarged perspective view of a portion of an automobile to which the present invention is applied.

The feature of the present invention is now described in detail. FIG. 5 is a perspective view showing the floor side structure of the automobile with the main floor panel 22, the rear floor panel 23 and the side sill outer panel 25 removed.

As shown in FIG. 5, the rear floor side member 26 is formed with a recess 26a conformed to the sectional shape of the rear floor cross member 27. The cross member 27 extends to the inner panel 24 of the side sill 21 and is welded thereto (as indicated by numeral 73 of FIGS. 2, 3 and 5). Further, the rear floor cross member 27 is welded to the recess 26a of the rear floor side member 26 (as indicated by numeral 63 of FIGS. 2, 3 and 5). The rear floor side member 26 extends toward the front of the body under the rear floor cross member 27 and is welded to the main floor panel 22 as shown in FIG. 4 (as indicated by numeral 64 of FIG. 4).

Figure 6:
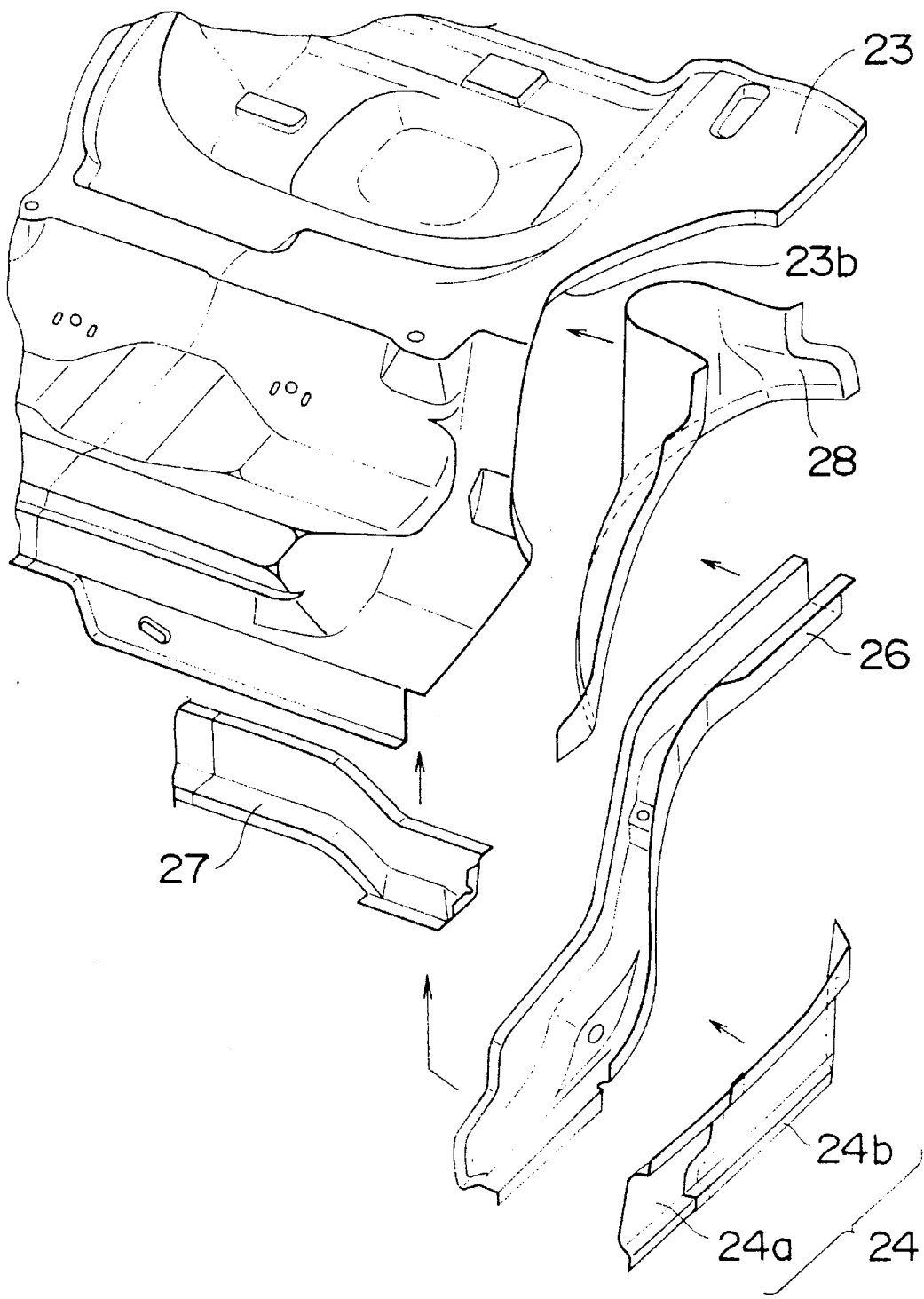
FIG. 6 is an exploded perspective view of a portion of an automobile to which the present invention is applied.
Figure 7:
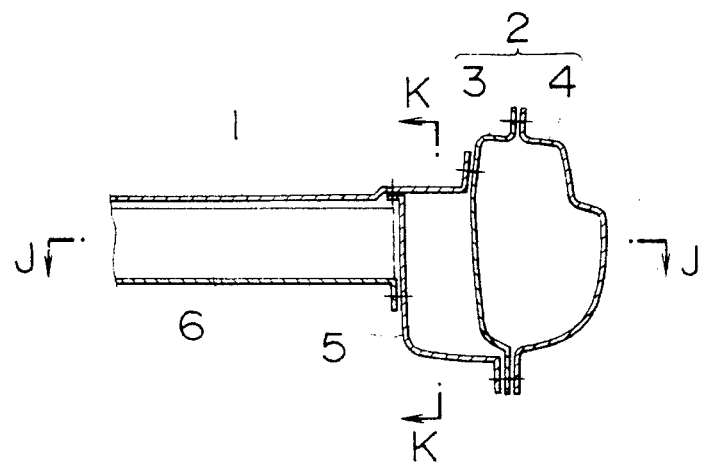
FIG. 7 is a sectional view of a portion showing a side structure of a floor of an automobile in a prior art.
Figure 8:
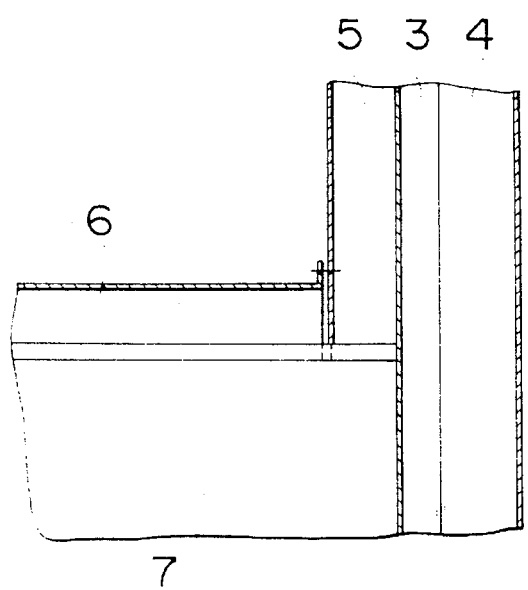
FIG. 8 is a sectional view taken along line J—J of FIG. 7.
Figure 9:
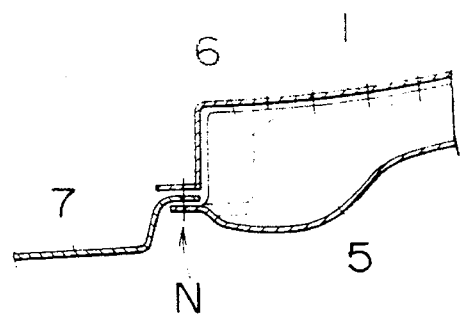
FIG. 9 is a sectional view taken along line K—K of FIG. 7.
Figure 10:
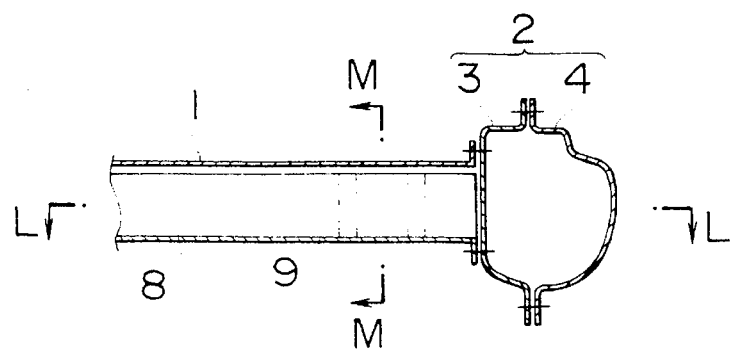
FIG. 10 is a sectional view of a portion showing a side structure of a floor of an automobile in a second prior art.
Figure 11:
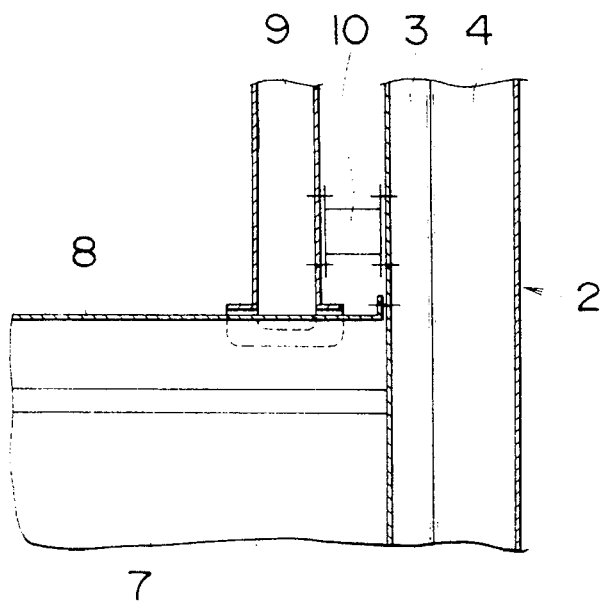
FIG. 11 is a sectional view taken along line L—L of FIG. 10.
Figure 12:
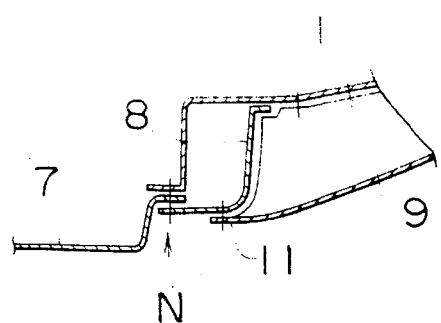
FIG. 12 is a sectional view taken along line M—M of FIG. 10.

FIG. 6 is an exploded perspective view of a portion of the embodiment. The rear floor cross member 27 is joined to the front edge of the rear floor panel 23 from below the rear front panel. A rear wheel housing 28 is joined along a side edge 23b of the rear floor panel 23. Further, the rear floor side member 26 is joined along both side edges 23b of the rear floor panel 23 from below the rear floor panel. At this time, as described above, the front end portion of the rear floor side member 26 overlaps the side portion of the rear front cross member 27 and is protruded toward the front of the body over the front end of the rear floor panel 23.

Further, in the embodiment, the side sill inner panel 24 is divided into two front and rear side members in the forward and backward direction of the body. The front side member is defined as a side sill inner panel body 24a and the rear side member is defined as a rear floor front compartment 24b.

The side sill inner panel 24 described so far represents the rear floor front compartment 24b actually in the embodiment. By structuring the side sill inner panel 24 in this manner, a press mold thereof can be advantageously made small. However, it is a matter of course that both of the side sill inner panel body 24a and the rear floor front compartment 24b can be formed integrally. In this case, the welding process for joining both of them can be eliminated.

As described above, according to the floor side structure of the automobile of the present invention, in the floor side structure of the automobile in which the depending wall 23a formed in the front end of the rear floor panel 23 is connected to the rear end of the main floor panel 22 to form the floor panel 20 and the side sill 21 is fixedly mounted to each side of the floor panel 20, the rear floor side member 26 is disposed along the side sill inner panel 24 of the side sill 21 and the rear floor cross member 27 is disposed along the depending wall 23a of the rear floor panel 23. Both the end portions of the rear floor cross member 27 go over the rear floor side members 26 and are fixed to the side sill inner panels 24. Accordingly, the following effects can be obtained.

That is, in the present invention, since both end portions of the rear floor cross member go over the rear floor side member and are fixed to the side sill inner panels, the stress in the right and left direction of the body acts on the joined portion of both of them in the shear direction and the joining strength can be improved. Furthermore, both end portions of the rear floor cross member are combined with the side sill inner panels and the stiffness for twist around the axis in the length direction of the rear floor cross member can be improved.

Accordingly, the strength for the stress in the right and left direction of the body and the strength for the twist around the long axis of the rear floor cross member can be improved without increasing the number of components constituting the framework of the rear floor panel.

Further, the front end of the rear floor side member is extended to the front of the joined portion of the rear edge of the main floor panel and the rear floor panel and is joined to the lower surface of the main floor panel, so that the discontinuity of the stiffness as in the prior art can be eliminated and the balance of the stiffness can be improved.

In addition, the singular point of vibration can be removed by the improved balance of the stiffness and noise in the room of the automobile can be reduced.

I claim:

1. A side structure of a floor of an automobile having a length direction and a width direction extending from side to side of the automobile, said automobile including a floor panel having sides, a rear floor panel including a front end having a depending wall, and a main floor panel having a rear end, said floor panel formed by connecting said depending wall provided at said front end of said rear floor panel to said rear end of said main floor panel, right and left sills fixed to both sides of said floor panel, said sills having inner panels, rear floor side members disposed along said inner panels of said sills, each of said rear floor side members being formed with concave portions, and a rear floor cross member having ends, said cross member disposed along said depending wall of said rear floor panel in the direction of width of the automobile, said rear floor cross member assuming an almost L-shape in cross section, said side structure of a floor also comprising: said rear floor cross member being mounted on and welded to said concave portions of said rear floor side members and each of said ends of said rear floor cross member being fixed to one of said inner panels of said sills, with said rear floor cross member traversing said rear floor side members and forming a closed cross-sectional portion with said depending wall by enclosing an open space between the depending wall of the rear floor panel and the upstanding leg of the L-shaped rear floor cross member, said closed cross-sectional portion extending across the width of the automobile from said inner panel on one side of the automobile to the inner panel on the other side of the automobile.

2. A side structure of a floor of an automobile according to claim 1, wherein said rear floor side members have a substantially L-shaped cross-section and are disposed in the length direction of the automobile, said rear floor side members including an upper end flange fixed to said rear floor panel and a lower end flange fixed to a lower end flange of said inner panel.

3. A side structure of a floor of an automobile according to claim 1, wherein said rear floor cross member is disposed in the width direction of the automobile, said rear floor cross member including an upper end flange fixed to said rear floor panel and a lower end flange fixed to a rear end flange of said main floor panel.

* * * * *